(12) United States Patent
Wang

(10) Patent No.: US 9,068,040 B2
(45) Date of Patent: *Jun. 30, 2015

(54) SOLVENT RESISTANT THERMOPLASTIC TOUGHENED EPOXY

(75) Inventor: Yen-Seine Wang, San Ramon, CA (US)

(73) Assignee: Hexcel Corporation, Dublin, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/902,302

(22) Filed: Oct. 12, 2010

(65) Prior Publication Data

US 2012/0088863 A1    Apr. 12, 2012

(51) Int. Cl.
*C08L 63/00* (2006.01)
*C08G 59/50* (2006.01)
*C08G 59/32* (2006.01)

(52) U.S. Cl.
CPC .............. *C08G 59/504* (2013.01); *C08G 59/32* (2013.01); *C08L 63/00* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 5,045,609 A | 9/1991 | Lee et al. | |
| 5,434,226 A * | 7/1995 | Nguyen et al. | 525/534 |
| 5,527,593 A | 6/1996 | Ardakani et al. | |
| 6,447,915 B1 * | 9/2002 | Komiyatani et al. | 428/416 |
| 7,754,322 B2 | 7/2010 | Tilbrook et al. | |
| 8,470,923 B2 * | 6/2013 | Boyle et al. | 524/538 |
| 8,686,069 B2 * | 4/2014 | Wang | 523/427 |
| 2013/0260022 A1 * | 10/2013 | Boyle et al. | 427/122 |

FOREIGN PATENT DOCUMENTS

| | | |
|---|---|---|
| CN | 101544879 | 9/2009 |
| CN | 102181251 | 9/2011 |
| EP | 1700874 | 9/2006 |
| JP | H08225667 | 9/1996 |
| JP | H10292030 | 11/1998 |
| JP | 2003-221430 | 8/2003 |
| JP | 2003-221430 A * | 8/2003 |
| WO | 85/00823 | 2/1985 |
| WO | 91/02029 | 2/1991 |
| WO | 94/06876 | 3/1994 |

OTHER PUBLICATIONS

Derwent accession No. 2009-P79319 for Chinese Patent No. 101544879 A, Yu et al., Sep. 30, 2009, two pages.*
HCAPLUS acession No. 2009:1213448 for Chinese Patent No. 101544879 A, Yu et al., Sep. 30, 2009, three pages.*
Derwent accession No. 2009-S52934 for Chinese Patent No. 101597417 A, Chen et al., Dec. 9, 2009, two pages.*
HCAPLUS accession No. 2009:1544539 for Chinese Patent No. 101597417 A, Chen et al., Dec. 9, 2009, four pages.*
Database CAPLUS [Online], Chemical Abstracts Service, Columbus, Ohio,US; jpn kokai tokkyo koho: "Halogen free resin coompositions", XP002681933, Database accession No. 2003:596626 abstract, Aug. 5, 2003.
Database WPI, Week 200974, Thomson Scientific, London, GB; AN 2009-P79319, XP002681934, Sep. 30, 2009.
Database WPI, Week 201182, Thomson Scientific, London, GB; AN 2011-N01158, XP002681935, Sep. 14, 2011.

* cited by examiner

*Primary Examiner* — Robert Sellers
(74) *Attorney, Agent, or Firm* — W. Mark Bielawski; David J. Oldenkamp

(57) ABSTRACT

Thermoplastic toughened epoxy resin for use in making prepreg for aerospace applications. The resin includes an epoxy resin component comprising a tri functional epoxy resin and/or tetra functional epoxy, a thermoplastic component and 4,4'-Bis(p-aminophenoxy) biphenyl (BAPB) as the curing agent. The use of BAPB as a curative was found to increase the resistance of the cured resin to attack by solvents.

18 Claims, 1 Drawing Sheet

SOLVENT RESISTANT THERMOPLASTIC TOUGHENED EPOXY

BACKGROUND OF THE INVENTION

1. Field of the Invention

The present invention relates generally to epoxy resins that are toughened with thermoplastic materials. Such toughened resins are used to make high performance composite parts. More particularly, the present invention is directed to increasing the resistance of such thermoplastic toughened epoxies to the crazing and cracking that can occur when the cured epoxies are exposed to solvents, such as methyl ethyl ketone (MEK).

2. Description of Related Art

Composite materials are typically composed of a resin matrix and reinforcing fibers as the two primary constituents. Resin matrices that contain one or more epoxy resins as a principal ingredient are widely used. The composite materials are often required to perform in demanding environments, such as in the field of aerospace where the physical limits and characteristics of composite parts are of critical importance.

Pre-impregnated composite material (prepreg) is used widely in the manufacture of composite parts. Prepreg is a combination of uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large effect on the structural properties of the part. Prepreg is a preferred material for use in manufacturing load-bearing or structural parts and particularly aerospace structural parts, such as wings, fuselages, bulkheads and control surfaces. It is important that these parts have sufficient strength, damage tolerance, interlaminar fracture toughness and other requirements that are routinely established for such parts.

The fiber reinforcements that are commonly used in aerospace prepreg are multidirectional woven fabrics or unidirectional tape that contains fibers extending parallel to each other. The fibers are typically in the form of bundles of numerous individual fibers or filaments that are referred to as a "tows". The fibers or tows can also be chopped and randomly oriented in the resin to form a non-woven mat. These various fiber reinforcement configurations are impregnated with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of pre-preg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The tensile strength of a cured composite material is largely dictated by the individual properties of the reinforcing fiber and matrix resin, as well as the interaction between these two components. In addition, the fiber-resin volume ratio is an important factor. Cured composites that are under tension tend to fail through a mechanism of accumulated damage arising from multiple tensile breakages of the individual fiber filaments located in the reinforcement tows. Once the stress levels in the resin adjacent to the broken filament ends becomes too great, the whole composite can fail. Therefore, fiber strength, the strength of the resin matrix, and the efficiency of stress dissipation in the vicinity of broken filament ends all contribute to the tensile strength of a cured composite material.

In many applications, it is desirable to maximize the tensile strength property of the cured composite material. However, attempts to maximize tensile strength can often result in negative effects on other desirable properties, such as the compression performance, damage tolerance and resistance to attack by solvents. In addition, attempts to maximize tensile strength can have unpredictable effects on the viscosity, tack and out-life of the resin matrix.

The viscosity of the uncured resin is an important factor that must be taken into consideration when forming prepreg. The viscosity of the resin must be low enough to insure that the resin components can be mixed completely and then impregnated thoroughly into the reinforcing fibers. The viscosity of the resin must also be high enough to insure that the resin does not flow to any substantial degree during storage or lay-up of the prepreg. Resins that do not have viscosities which meet these basic requirements cannot be used to make prepreg. In any attempt to increase strength and/or damage tolerance of a given cured composite material, it is important that the viscosity of the uncured resin remain within acceptable limits.

The stickiness or tackiness of the uncured prepreg is commonly referred to as "tack". The tack of uncured prepreg is an important consideration during lay-up and molding operations. Prepreg with little or no tack is difficult to form into laminates that can be molded to form composite parts. Conversely, prepreg with too much tack can be difficult to handle and also difficult to place into the mold. It is desirable that the prepreg have the right amount of tack to insure easy handling and good laminate/molding characteristics. In any attempt to increase strength and/or damage tolerance of a given cured composite material, it is important that the tack of the uncured prepreg remain within acceptable limits to insure suitable prepreg handling and molding.

The "out-life" of prepreg is the length of time that the prepreg may be exposed to ambient conditions before undergoing an unacceptable degree of curing. The out-life of prepreg can vary widely depending upon a variety of factors, but is principally controlled by the resin formulation being used. The prepreg out-life must be sufficiently long to allow normal handling, lay-up and molding operations to be accomplished without the prepreg undergoing unacceptable levels of curing. In any attempt to increase strength and/or damage tolerance of a given cured composite material, it is important that the out-life of the uncured prepreg remain as long as possible to allow sufficient time to process, handle and lay up the prepreg prior to curing.

A common method of increasing composite tensile performance is to change the surface of the fiber in order to weaken the strength of the bond between matrix and fiber. This can be achieved by reducing the amount of electro-oxidative surface treatment of the fiber after graphitization. Reducing the matrix fiber bond strength introduces a mechanism for stress dissipation at the exposed filament ends by interfacial de-bonding. This interfacial de-bonding provides an increase in the amount of tensile damage a composite part can withstand before failing in tension.

Alternatively, applying a coating or "size" to the fiber can lower the resin-fiber bond strength. This approach is well known in glass fiber composites, but can also be applied to composites reinforced with carbon fibers. Using these strategies, it is possible to achieve significant increases in tensile strength. However, the improvements are accompanied by a decrease in properties, such as compression after impact (CAI) strength, which requires high bond strength between the resin matrix and fibers.

Another method of increasing composite tensile performance and resistance to damage is to include one or more thermoplastic materials in the epoxy resin matrix. A variety of different thermoplastic materials in a variety of different forms have been used to toughen epoxy resins. For example, see U.S. Pat. No. 7,754,322.

Multiple layers of prepreg are commonly used to form composite parts for structural applications that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces. The G2c interlaminar fracture toughness is related to CAI. Prepreg materials that exhibit high damage tolerances also tend have high CAI and G2c values.

The cured prepreg must also be resistant to attack by solvents and other chemicals to which the cured composite part may be exposed. A common test to determine solvent-stress interactive effects on cured resins is to strain a cured resin specimen by bending the specimen and then exposing the strained specimen to a given solvent or other chemical for a period of time, which is typically on the order of a few days or more. The specimen is checked for stress cracking and/or crazing at various times during the test period. The specimens are typically strained in bending from 0% to about 2%. The strain varies proportionally to the arc length of the specimen, which is a characteristic of a clothoid curve (spiral). The test apparatus used to induce the clothoid curve to the specimen is known as a "clothoid strain jig". Use of the clothoid stain jig allows a single test specimen to be bent so as to provide strains over the entire test range.

Resin specimens are considered to be highly resistant to attack by a given solvent if they do not exhibit any cracks when subjected up to a 2% maximum strain in a clothoid strain jig and exposed to the solvent for 7 days at room temperature. In order to be suitable for use in aerospace applications, the cured epoxy resins must be highly resistant to attack by solvents to which the resin may be exposed. It is important that measures taken to strengthen and/or toughen an epoxy resin do not inadvertently reduce the resins resistance to attack by solvents.

Although many existing prepregs are well suited for their intended use in providing composite parts that are strong and damage tolerant, there still is a continuing need to provide prepreg that may be used to make composite parts for structural applications that have high levels of strength (e.g. compression strength), high damage tolerance (CAI) and interlaminar fracture toughness (G1c and G2c) and which exhibit a high resistance to attack by solvents.

SUMMARY OF THE INVENTION

In accordance with the present invention uncured resins are provided that are suitable for use in aerospace applications where high levels of strength, damage tolerance and interlaminar toughness are required. The invention is applicable to multi functional epoxy resins that are toughened with one or more thermoplastic materials and cured with a conventional diamine curing agent, such as 3,3'-diaminodiphenyl sulphone (3,3'-DDS) and/or 4,4'-diaminodiphenyl sulphone (4,4'-DDS). The invention is based, at least in part, on the discovery that using 4,4'-Bis(p-aminophenoxy)biphenyl (BAPB) in place of 3,3'-DDS or 4,4'-DDS as the curing agent causes a significant increase in the ability of such thermoplastic-toughened epoxies to resist attack by solvents.

The present invention covers uncured resins that include an epoxy resin component made up of a tri functional epoxy resin and/or tetra functional epoxy resin. The uncured resin further includes a thermoplastic component and BAPB as the curing agent. The invention also covers the uncured resin in combination with a fiber reinforcement as well as the cured combinations of resin and fiber reinforcement that are suitable for use as at least part of a primary structure of an aircraft.

Prepreg and the methods for making prepreg using BAPB-cured thermoplastic-toughened multi functional epoxy resins are also part of the present invention. The prepreg is suitable for use in fabricating cured composite parts that are highly resistant to solvent attack and which are otherwise suitable for use as at least part of a primary structure of an aircraft.

The above described and many other features and attendant advantages of the present invention will become better understood by reference to the following detailed description when taken in conjunction with the accompanying drawings.

DETAILED DESCRIPTION OF THE INVENTION

Uncured matrix resin compositions in accordance with the present invention may be used in a wide variety of situations where a thermoplastic-toughened epoxy resin is desired. Although the uncured epoxy resin compositions may be used alone, the compositions are generally combined with a fibrous support to form composite materials. The composite materials may be in the form of a prepreg, partially cured prepreg or a completely cured final part. The term "uncured", when used herein in connection with prepreg, matrix resin or composite material, is intended to cover items that may have been subjected to some curing, but which have not been completely cured to form the final composite part or structure.

Although the composite materials may be used for any intended purpose, they are preferably used in aerospace vehicles and particularly preferred for use in civilian and military aircraft. For example, the composite materials may be used to make non-primary (secondary) aircraft structures. However the preferred use of the composite material is for structural applications, such as primary aircraft structures. Primary aircraft structures or parts are those elements of either fixed-wing or rotary wing aircraft that undergo significant stress during flight and which are essential for the aircraft to maintain controlled flight. The composite materials may also be used for other structural applications to make load-bearing parts and structures in general.

Figure 1:
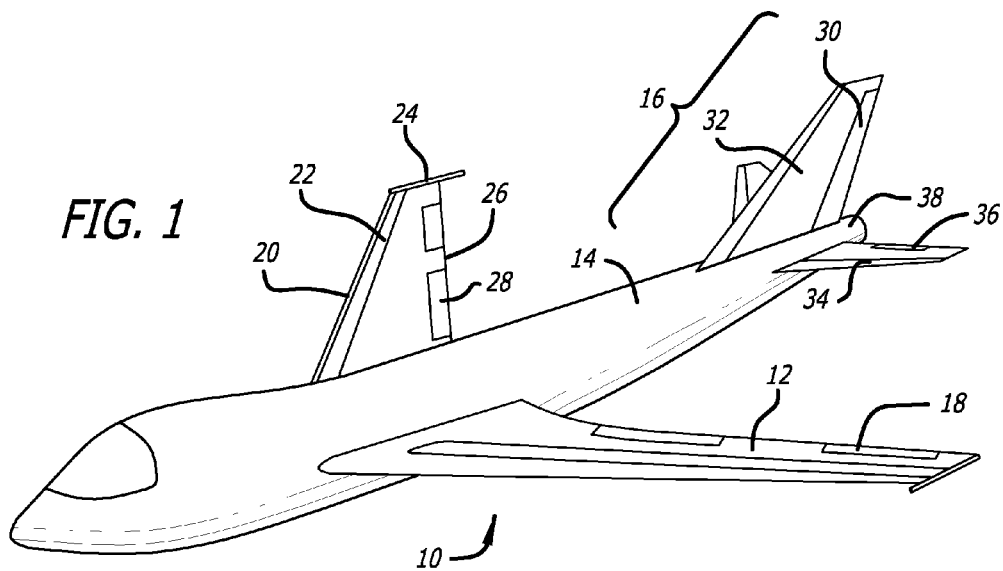
FIG. 1 is a perspective view of an aircraft, which depicts exemplary primary aircraft structures that can be made using composite materials in accordance with the present invention.
Figure 2:
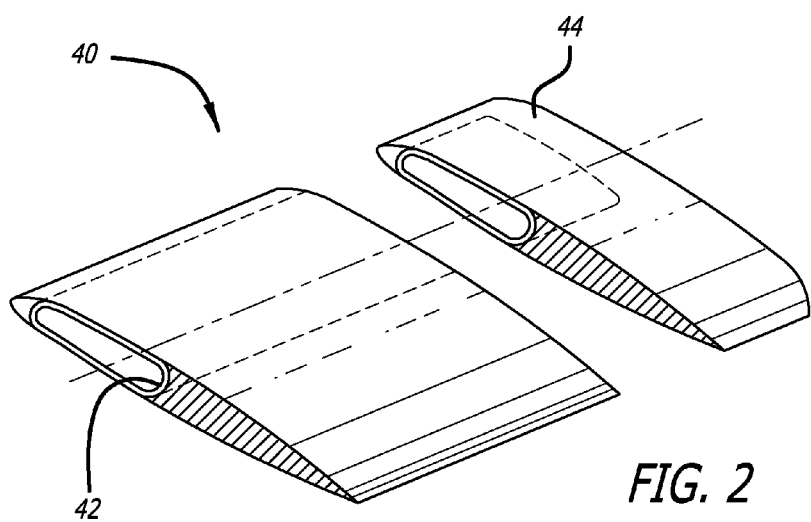
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The uncured resin and pre-impregnated composite materials (prepreg) of the present invention may be used as replacements for existing uncured resin and/or prepreg that are being used to form composite parts in the aerospace industry and in any other structural applications where high strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes that are suitable for thermoplastic-toughened epoxy resins.

Pre-impregnated composite materials in accordance with the present invention are composed of reinforcing fibers and an uncured resin matrix. The reinforcing fibers can be any of the conventional fiber configurations that are used in the prepreg industry. The matrix includes an epoxy resin component that includes a combination of tri functional and tetra functional aromatic epoxy resins. The resin matrix further includes a thermoplastic component and 4,4'-Bis(p-aminophenoxy)biphenyl (BAPB) as the curing agent. The chemical structure for BAPB is set forth below.

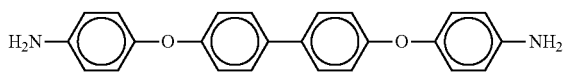

As will be discussed in detail below, a feature of the present invention is the discovery that the use of BAPB to cure thermoplastic-toughened epoxy resins produces cured composite materials that are highly resistant to attack by solvents, such as MEK.

The epoxy resin component is composed of one or more tri functional epoxy resins and/or tetra functional epoxy resins. Preferred is a combination of trifunctional and tetrafunctional epoxy resins. The multi functional epoxy resins may be saturated, unsaturated, cylcoaliphatic, alicyclic or heterocyclic. Suitable multi functional epoxy resins, by way of example, include those based upon: phenol and cresol epoxy novolacs, glycidyl ethers of phenol-aldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof. The epoxy resin component should make up from 40 to 65 weight percent of the matrix resin.

A tri functional epoxy resin will be understood as having the three epoxy groups substituted either directly or indirectly in a para or meta orientation on the phenyl ring in the backbone of the compound. A tetra functional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetra functional epoxy resins include N',N,'N-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morristown, N.J.). Suitable tri functional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof.

A preferred tri functional epoxy resin is triglycidyl meta-aminophenol. Triglycidyl meta-aminophenol is available commercially from Huntsman Advanced Materials (Monthey, Switzerland) under the trade names Araldite MY0600 or MY0610 and from Sumitomo Chemical Co. (Osaka, Japan) under the trade name ELM-120.

Additional examples of suitable multi functional epoxy resin include N,N,N',N'-tetraglycidyl-4,4'-diaminodiphenyl methane (TGDDM available commercially as Araldite MY720 and MY721 from Huntsman Advanced Materials (Monthey, Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl) and methane-based epoxy resin such as Tactix 742 (available commercially from Huntsman Advanced Materials). Other suitable multi-functional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials). TGDDM (MY720 or MY721) is a preferred tetra functional epoxy.

It is preferred that the resin matrix include from 20 to 40 weight percent of tri functional epoxy resin and 10 to 30 weight percent tetra functional epoxy resin. More preferred is a resin matrix that contains from 30 to 40 weight percent of trifunctional epoxy resin and 10 to 20 weight percent tetra functional epoxy resin. A combination of triglycidyl meta-aminophenol (MY0600 or MY0610) with TGDDM (MY720 or MY721) is particularly preferred.

The uncured resin matrix of the present invention also includes a thermoplastic component that includes one or more thermoplastic materials that may be soluble or insoluble in the epoxy resin. It is preferred that the thermoplastic component includes a combination of soluble and insoluble thermoplastic materials.

With respect to soluble thermoplastic materials, any suitable soluble thermoplastic polymer that has been used as toughening agent may be used. Typically, the thermoplastic polymer is added to the resin mix as particles that are dissolved in the resin mixture by heating prior to addition of the insoluble particles and curing agent. Once the thermoplastic polymer is substantially dissolved in the hot matrix resin precursor (i.e. the blend of epoxy resins), the precursor is cooled and the remaining ingredients (curing agent and insoluble thermoplastic(s)) are added.

Exemplary soluble thermoplastics that can be used alone or in combination in the thermoplastic component include: polyethersulfone, polyetherimide and polysulphone.

Polyethersulfone (PES) is preferred for use as the soluble thermoplastic component. PES is sold under the trade name Sumikaexcel 5003P, which is commercially available from Sumitomo Chemicals. Alternatives to 5003P are Solvay polyethersulphone 105RP or VW-10200RP or the non-hydroxyl terminated grades such as Solvay 1054P (Solvay Advanced Polymers—Greenville, S.C.). The molecular weight of 5003P and VW-10200RP is 46,500 g/mole. Polyetherimide is available from General Electric (Pittsfield, Mass.) under the trade name ULTEM 1000P. It is preferred that the uncured resin matrix include from 10 to 20 weight percent of the soluble thermoplastic material. More preferred is an uncured resin matrix that contains from 12 to 18 weight percent soluble thermoplastic material. Most preferred are resin matrix that contain from 13 to 15 weight percent soluble thermoplastic material.

The thermoplastic component also preferably includes insoluble thermoplastic particles. These particles do not dissolve during the curing process and remain within the interlayer zones of the cured composite material. The amount of insoluble particles in the uncured resin matrix is preferably from 5 to 30 weight percent. More preferred are resin matrices that contain from 10 to 20 weight percent insoluble particles. Most preferred are resin matrices that contain from 10 to 16 weight percent insoluble particles.

Examples of suitable thermoplastic particles include polyamideimide (PAI) particles and polyamide (PA) particles. The thermoplastic particles have glass transition temperatures ($T_g$) that are above room temperature (22° C.). Polyamide particles are preferred.

Polyamide particles come in a variety of grades that differ in the particular polyamide or polyamides present in the particle and the molecular weight and polymeric characteristics of the polyamide polymers and copolymers, such as the degree of crystallinity. It is preferred that the polyamide particles have a Young's modulus of between 150 and 400 ksi.

Suitable polyamide particles contain polyamide 6 (caprolactame—PA6), polyamide 12 (laurolactame—PA12), polyamide 11 and copolymers of these polyamides. The particles should have particle sizes of below 100 microns. It is preferred that the particles range in size from 5 to 60 microns and more preferably from 5 to 30 microns. The particles should be substantially spherical. The particles can be made by anionic polymerization in accordance with PCT application WO2006/051222, by co-extrusion, precipitation polymerization, emulsion polymerization or by cryogenic grinding. Suitable polyamide particles are available commercially from Arkema of France under the trade name Orgasol.

Orgasol 1002 D NAT1 is an exemplary polyamide particle. Orgasol 1002 D NAT1 is composed of 100% PA6. The Young's modulus of Orgasol 1002 D NAT1 particles is about 300 ksi. The particles having a degree of crystallinity equal to 51%, a glass transition temperature (Tg) of 26° C., a density of 1.15 (ISO 1183), a molecular weight of 60,200 (g/mole) with a melting point of 217° C. and an average particle size of 20 microns. Another example of a suitable rigid particle is Orgasol 3202 D Nat 1 which contains PA6/PA12 copolymer particles (80% PA6 and 20% PA12) having a degree of crystallinity equal to 43%, a Tg of 29° C., a density of 1.09 (ISO 1183), a molecular weight of 60,800 (g/mole) and a solution viscosity of 1.01. The polyamide copolymer particles in Orgasol 3202 D Nat 1 have an average particle size of 20 microns and a melting point of 194° C. The amount of PA12 in the copolymer may be increased above 20%, if desired, provided that the melting point of the particles does not drop below the cure temperature for the matrix and preferably is at least 10° C. above the cure temperature.

Other exemplary polyamide particles include GRILAMID TR55 and TR90, which are both available from EMS Chemie AG (Sumter, S.C.). GRILAMID TR55 is a polyamide having an aliphatic, cycloaliphatic and aromatic polymer backbone. TR55 has a Tg of about 160° C. and a modulus of about 320 ksi. TR 90 is a polyamide having an aliphatic and cycloaliphatic polymer backbone. TR90 has a Tg of about 155° C. and a modulus of about 230 ksi.

It is preferred that the resin matrix include PA particles and that the amount of PA particles be in the range of 1 to 15 weight percent of the total resin matrix. More preferred are PA particle amounts in the range of 2-10 weight percent.

Suitable PAI particles are available commercially as TORLON 4000T or TORLON 4000TF from Solvay Advanced Polymers (Alpharetta, Ga.). The average particle size range for the PAI particles is from 8 microns to 20 microns. PAI particles have a Young's modulus of about 600 ksi. The resin matrix, if desired, may include PAI particles in amounts up to 15 weight percent of the total resin matrix.

The uncured resin may also include small amounts (up to 5 weight percent of the total resin matrix) of elastic particles. Suitable elastic particles include particles that are composed principally of polyurethane. The elastic particles preferably contain at least 95 weight percent polyurethane polymer. Other elastic particles that are composed of a high molecular weight elastomer that is insoluble in epoxy may also be used. The Young's modulus of elastic particles should be below 10 ksi. The Tg of elastic particles should be at room temperature (22° C.) or below Polyurethane particles that contain a small amount (less than 5 weight percent) of silica are a preferred type of elastic particle. Polyurethane particles that are available from Aston Chemicals (Aylesbury, UK) under the trade name SUNPU-170 are a preferred type of polyurethane particle. SUNPU-170 is composed of HDI/Trimethylol Hexyllactone Crosspolymer, Silica. The particles contain about 95 to 99 weight percent urethane polymer and 1 to 5 weight percent silica. The particles are microspheres that range in diameter from 5 microns to 20 micron. Suitable polyurethane particles are also available from Kobo Products (South Plainfield, N.J.) under the trade name BPD-500, BP-500T and BP-500W. These particles are also composed of HDI/Trimethylol hexyllactone Crosspolymer and silica. The particles are also microspheres that range in size from 10 microns to 15 microns. The BPD-500 microspheres contain from 1 to 3 weight percent silica and from 97 to 99 weight percent polyurethane.

The particle sizes and relative amounts of the insoluble thermoplastic particles and elastic particles are selected so that not only are the desired levels of OHC, CAI, G1c and G2c achieved, but also so that the viscosity of the epoxy resin composition is within a range that is suitable for prepreg preparation. It is preferred that the viscosity of the resin be the same as the viscosity of existing high performance toughened resins that are presently used in the aerospace industry to make prepreg including quasi-isotropic chopped prepreg. In order to achieve the desired combination of uncured resin properties and cured composite properties in accordance with the present invention, it may be necessary to combine two or more of the above described thermoplastic materials to provide a thermoplastic component that contains more than one type of insoluble thermoplastic particle.

It was discovered that using low molecular weight PES helps keep the viscosity of the uncured resin within acceptable limits for prepreg preparation. This is especially the case for uncured resins where the amount of thermoplastic materials added is toward the higher end of the acceptable range and/or where elastic particles are included as part of the resin mix. It is preferred that the low molecular weight PES have a molecular weight of between 15,000 g/mole and 25,000 g/mole. Low molecular weight PES is available commercially form Solvay Advanced Polymers as VW-10700RP. The molecular weight of VW-10700RP is 21,000 g/mole.

It is preferred that the low molecular weight PES be used in place of the higher molecular weight PES, which is typically used in thermoplastic-toughened epoxy resins, if the viscosity of resin is too high. Use of low molecular weight PES is also preferred because it contributes to increasing the solvent resistance of the cured resin.

As a feature of the present invention, the thermoplastic-toughened epoxy is cured using 4,4'-Bis(p-aminophenoxy) biphenyl (BAPB) as the curing agent. Isomers of BAPB, such as 3,3'-Bis(p-aminophenoxy)biphenyl may also be used in place of BAPB. The amount of BABP included in the uncured resin will depend on the amount and type of epoxies present in the uncured resin. The amount of BAPB should be sufficient to insure complete curing of the uncured resin. This amount can be calculated based on the functionality and amount of each epoxy resin in the formulation. The amount of BAPB needed to provide complete cure will be between 15 and 45 weight percent of the total uncured resin. BAPB is added to the epoxy resins in the same manner as other conventional curing agent, such as 3,3'-DDS or 4,4'-DDS. BAPB is preferably incorporated into the uncured resin at the same time as the insoluble thermoplastic particles.

The uncured resin may also include additional ingredients, such as performance enhancing or modifying agents and additional thermoplastic polymers provided they do not adversely affect the viscosity, tack and out-life of the prepreg or the strength, damage tolerance and resistance to solvents of the cured composite part. The performance enhancing or modifying agents, for example, may be selected from flexibilizers, additional thermoplastic polymers, accelerators, core shell rubbers, flame retardants, wetting agents, pigments/dyes, UV absorbers, anti-fungal compounds, fillers, conducting particles, and viscosity modifiers. Suitable additional thermoplastic polymers include any of the following, either alone or in combination: polyether ethersulphone (PEES), polyphenyl sulphone, polyimide, aramid, polyester, polyketone, polyetheretherketone (PEEK), polyurea, polyarylether, polyarylsulphides, polycarbonates, polyphenylene oxide (PPO) and modified PPO.

Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa).

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon particles, carbon nanotubes and carbon nanofibers. Metal-coated fillers may also be used, for example nickel coated carbon particles and silver coated copper particles.

The uncured resin may include, if desired, an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, bismaleimide, vinyl ester, benzoxazine and phenolic resins. If desired, the matrix may include further suitable resins containing phenolic groups, such as resorcinol based resins, and resins formed by cationic polymerization, such as DCPD—phenol copolymers. Still additional suitable resins are melamine-formaldehyde resins, and urea-formaldehyde resins.

The uncured resin is made in accordance with standard prepreg matrix processing. In general, the various epoxy resins are mixed together at room temperature to form a resin mix to which the thermoplastic component is added. This mixture is then heated to a temperature above the melting point of the thermoplastic(s) in the thermoplastic component for a sufficient time to substantially melt the thermoplastic(s). The mixture is then cooled down to room temperature or below and the insoluble thermoplastic particles, curing agent and other additives, if any, are then mixed into the resin to form the final uncured resin that is impregnated into the fiber reinforcement.

The uncured resin is applied to the fibrous reinforcement in accordance with any of the known prepreg manufacturing techniques. The fibrous reinforcement may be fully or partially impregnated with the uncured resin. In an alternate embodiment, the uncured resin may be applied to the fiber fibrous reinforcement as a separate film or layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary uncured resin includes from 27 to 38 weight percent triglycidyl-m-aminophenol (tri functional epoxy resin); from 10 to 20 weight percent tetra functional para-glycidyl amine (tetra functional epoxy resin); from 10 to 20 weight percent polyethersulfone (soluble thermoplastic); from 5 to 15 weight percent polyamideimide (insoluble thermoplastic particle); from 5 to 15 weight percent polyamide particles (insoluble thermoplastic particle); and from 20 to 30 weight percent BAPB (curing agent).

A preferred uncured resin includes about 32 to 34 weight percent triglycidyl-m-aminophenol (tri functional epoxy resin); about 14 to 16 weight percent tetra functional para-glycidyl amine (tetra functional epoxy resin); about 13 to 15 weight percent polyethersulfone (soluble thermoplastic); about 5 to 10 weight percent polyamideimide (insoluble thermoplastic particle); about 5 to 10 weight percent polyamide particles (insoluble thermoplastic particle); and about 23 to 26 weight percent BAPB (curing agent).

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The uncured composite material may also be cured using a method selected from UV-visible radiation, microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful for other high performance structural applications in the automotive, rail, marine and energy industries where high tensile strength, compressive strength, interlaminar fracture toughness and resistance to impact damage are needed.

It was discovered that the BAPB-cured resins in accordance with the present invention are highly resistant to attack by MEK. When strained and immersed in MEK at room temperature, the cured resins exhibit no visible cracking for at least 7 days. In view of the cured resins high resistance to attack by MEK, it is expected that the cured resins will also be highly resistant to attack by other ketone type solvents, such as acetone. The cured resins will also be highly resistant to less aggressive solvents to which the cured resins might be exposed during use as part of an aircraft. Such potential solvents include hydraulic fluid, jet fuel, gasoline, alcohols and organic solvents.

In order that the present invention may be more readily understood, reference will now be made to the following examples of the invention.

EXAMPLE 1

An exemplary resin formulation in accordance with the present invention is set forth in TABLE 1. A matrix resin was prepared by mixing the epoxy ingredients at room temperature with the polyethersulfone to form a resin blend that was heated to 130° C. for 60 minutes to completely dissolve the polyethersulfone. The mixture was cooled to 80° C. and the rest of the ingredients (polyamideimide particles, polyamide particles and BAPB curing agent) were added and mixed in thoroughly to form the uncured resin.

TABLE 1

| Amount (Wt %) | Ingredient |
| --- | --- |
| 33.39 | Trifunctional meta-glycidyl amine (MY0610) |
| 15.03 | Tetrafunctional para-glycidyl amine (MY721) |
| 14.14 | Polyethersulfone (Sumikaexcel 5003P) |
| 9.78 | Polyamideimide (Torlon 4000TF) |
| 3.04 | Polyamide particles (Orgasol 1002 D Nat 1) |
| 24.63 | 4,4'-Bis (p-aminophenoxy) biphenyl (BAPB) |

The uncured resin had a viscosity that was suitable for use in making prepreg. When impregnated into a fiber reinforcement, the resulting prepreg will have tack and out-life properties that are acceptable for use in forming articles for molding. Exemplary prepreg can be prepared by impregnating one or more layers of unidirectional carbon fibers with the resin formulation of TABLE 1. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours.

A specimen for solvent resistance testing was prepared using the resin formulation of TABLE 1. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature for a period of 7 days. After 7 days, no cracks were observed in the test specimen. Crazing was observed above the 1.1% strain location for the test specimen.

COMPARATIVE EXAMPLE 1

A comparative resin having the formulation set forth in TABLE 2 was prepared in the same manner as EXAMPLE 1. The resin is the same as the resin in Example 1, except that BAPB has been replaced with 3,3'-DDS as the curing agent.

TABLE 2

| Amount (Wt %) | Ingredient |
| --- | --- |
| 35.52 | Trifunctional meta-glycidyl amine (MY0610) |
| 15.99 | Tetrafunctional para-glycidyl amine (MY721) |
| 15.04 | Polyethersulfone (Sumikaexcel 5003P) |
| 10.75 | Polyamideimide (Torlon 4000TF) |
| 3.23 | Polyamide particles (Orgasol 1002 D Nat 1) |
| 19.47 | 3,3'-diaminodiphenyl sulphone (3,3'-DDS) |

A specimen for solvent resistance testing was prepared using the resin formulation of TABLE 2. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature and cracked in 10 seconds.

EXAMPLE 2

Exemplary resin formulations in accordance with the present invention are set forth in TABLE 3. Uncured resins were prepared by mixing the epoxy ingredient at room temperature with the polyetherimide (PEI) to form a resin blend that was heated to 130° C. for 60 minutes to completely dissolve the PEI. The mixture was cooled to 80° C. and the BAPB curing agent was added and mixed in thoroughly to form the uncured resin.

TABLE 3

| 2A (Wt %) | 2B (Wt %) | Ingredient |
|---|---|---|
| 49 | 46 | Trifunctional meta-glycidyl amine (MY0610) |
| 11 | 17 | Polyetherimide (ULTEM 1000P) |
| 40 | 37 | 4,4'-Bis (p-aminophenoxy) biphenyl (BAPB) |

The uncured resins had a viscosity that was suitable for use in making prepreg. When impregnated into a fiber reinforcement, the resulting prepreg will have tack and out-life properties that are acceptable for use in forming articles for molding. Exemplary prepreg can be prepared by impregnating one or more layers of unidirectional carbon fibers with the resin formulations of TABLE 3. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours.

Specimens for solvent resistance testing were prepared using the resin formulations of TABLE 3. The resins were formed into specimens that were 4.5 inches (11.4 cm) long, 0.5 inch (1.3 cm) wide and 0.63 inch (0.16 cm) thick. The resins were cured in an autoclave at 180° C. for about 2 hours to form cured test specimens. The test specimens were strained in a standard clothoid test jig to provide strains ranging from 0% to a maximum of 2%. The strained test specimens were immersed in MEK at room temperature for a period of 7 days. After 7 days, no cracks were observed in either the 2A or 2B test specimens. Crazing was observed above the 1.1% strain point for both the 2A and 2B test specimens.

COMPARATIVE EXAMPLE 2

Comparative resins having the formulation set forth in TABLE 4 were prepared in the same manner as EXAMPLE 2. The resin is equivalent to the resin in Example 2, except that BAPB was replaced with 4,4'-DDS as the curing agent.

TABLE 4

| 2CA (Wt %) | 2CB (Wt %) | Ingredient |
|---|---|---|
| 57 | 53 | Trifunctional meta-glycidyl amine (MY0610) |
| 11 | 17 | Polyetherimide (ULTEM 1000P) |
| 32 | 30 | 3,3'-diaminodiphenyl sulphone (3,3'-DDS) |

Specimens for solvent resistance testing were prepared using the resin formulations of TABLE 4. The resins were formed into specimens that were 4.5 inches (11.4 cm) long, 0.5 inch (1.3 cm) wide and 0.63 inch (0.16 cm) thick. The resins were cured in an autoclave at 180° C. for about 2 hours to form cured test specimens. The test specimens were strained in a standard clothoid test jig to provide strains ranging from 0% to a maximum of 2%. The strained test specimens were immersed in MEK at room temperature and both specimens 2CA and 2CB cracked in 10 seconds.

EXAMPLE 3

Exemplary resin formulations in accordance with the present invention are set forth in TABLE 5. Uncured resins were prepared by mixing the epoxy ingredient at room temperature with the polyethersulfone (PES) to form a resin blend that was heated to 130° C. for 60 minutes to completely dissolve the PES. The mixture was cooled to 80° C. and the BAPB curing agent was added and mixed in thoroughly to form the uncured resin.

TABLE 5

| 3A (Wt %) | 3B (Wt %) | 3C (Wt %) | Ingredient |
|---|---|---|---|
| 25 | 24.5 | 23.5 | Trifunctional para-glycidyl amine (MY0510) |
| 25 | 24.5 | 23.5 | Tetrafunctional para-glycidyl amine (MY721) |
| 15 | 17 | 19 | Polyethersulfone (Sumikaexcel 5003P) |
| 35 | 34 | 34 | 4,4'-Bis (p-aminophenoxy) biphenyl (BAPB) |

The uncured resins had a viscosity that was suitable for use in making prepreg. When impregnated into a fiber reinforcement, the resulting prepreg will have tack and out-life properties that are acceptable for use in forming articles for molding. Exemplary prepreg can be prepared by impregnating one or more layers of unidirectional carbon fibers with the resin formulations of TABLE 5. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours.

Specimens for solvent resistance testing were prepared using the resin formulations of TABLE 5. The resins were formed into specimens that were 4.5 inches (11.4 cm) long, 0.5 inch (1.3 cm) wide and 0.63 inch (0.16 cm) thick. The resins were cured in an autoclave at 180° C. for about 2 hours to form cured test specimens. The test specimens were strained in a standard clothoid test jig to provide strains ranging from 0% to a maximum of 2%. The strained test specimens were immersed in MEK at room temperature for a period of 7 days. After 7 days, no cracks were observed in the 3A, 3B or 3C test specimens. Test specimen 3A exhibited no crazing. Test specimen 3B exhibited crazing beginning at the 1.4% strain location on the specimen. Test specimen 3C exhibited crazing beginning at the 1.8% strain location on the specimen.

COMPARATIVE EXAMPLE 3

Comparative resins having the formulation set forth in TABLE 6 were prepared in the same manner as EXAMPLE 3. The resin is equivalent to the resin in Example 2, except that BAPB has been replaced with 4,4'-DDS as the curing agent.

TABLE 6

| 3CA (Wt %) | 3CB (Wt %) | 3CC (Wt %) | Ingredient |
|---|---|---|---|
| 29 | 28 | 27.5 | Trifunctional para-glycidyl amine (MY0510) |
| 29 | 28 | 27.5 | Tetrafunctional para-glycidyl amine (MY721) |
| 15 | 17 | 19 | Polyethersulfone (Sumikaexcel 5003P) |
| 24 | 24 | 23 | 3,3'-diaminodiphenyl sulphone (3,3'-DDS) |
| 3 | 3 | 3 | 4,4'-diaminodiphenyl sulphone (4,4'-DDS) |

Specimens for solvent resistance testing were prepared using the resin formulations of TABLE 6. The resins were formed into specimens that were 4.5 inches (11.4 cm) long, 0.5 inch (1.3 cm) wide and 0.63 inch (0.16 cm) thick. The resins were cured in an autoclave at 180° C. for about 2 hours to form cured test specimens. The test specimens were strained in a standard clothoid test jig to provide strains ranging from 0% to a maximum of 2%. The strained test specimens were immersed in MEK at room temperature for a period of 7 days. After 7 days, no cracks were observed in the 3A, 3B or 3C test specimens. Test specimen 3CA exhibited crazing beginning at the 1.0% strain location on the specimen. Test specimen 3CB exhibited crazing beginning at the 1.3% strain location and test specimen 3CC exhibited crazing beginning at the 1.0% strain location.

EXAMPLE 4

An exemplary resin formulation in accordance with the present invention is set forth in TABLE 7. Uncured resin was prepared by mixing the epoxy ingredient at room temperature with the polyethersulfone (PES) to form a resin blend that was heated to 130° C. for 60 minutes to completely dissolve the PES. The mixture was cooled to 80° C. and BAPB, as the curing agent, was added and mixed in thoroughly to form the uncured resin.

TABLE 7

| Amount (Wt %) | Ingredient |
|---|---|
| 24.3 | Trifunctional para-glycidyl amine (MY0510) |
| 24.3 | Tetrafunctional para-glycidyl amine (MY721) |
| 17.0 | Low MW PES (VW-10700RP) |
| 34.4 | 4,4'-Bis (p-aminophenoxy) biphenyl (BAPB) |

The uncured resin had a viscosity that was suitable for use in making prepreg. When impregnated into fiber reinforcement, the resulting prepreg will have tack and out-life properties that are acceptable for use in forming articles for molding. Exemplary prepreg can be prepared by impregnating one or more layers of unidirectional carbon fibers with the resin formulation of TABLE 7. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours.

A specimen for solvent resistance testing was prepared using the resin formulation of TABLE 7. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature for a period of 7 days. After 7 days, the test specimen exhibited no crazing or cracking. As can be seen from a comparison of Examples 3 and 4, it is preferred that low molecular weight PES be used in combination with BAPB when relatively high amounts (over 15 wt %) of PES are present in the resin formulation. Use of the low molecular weight PES in accordance with Example 4 at a loading of 17 wt % eliminated the crazing observed in Example 3B.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An uncured thermoplastic-toughened epoxy resin which is curable to form a cured resin, wherein said cured resin resists cracking when exposed to a solvent, said uncured resin comprising:

an epoxy resin component comprising from 27 to 38 weight percent triglycidyl-m-aminophenol based on the total weight of the uncured resin and from 10 to 20 weight percent tetra functional para-glycidyl amine based on the total weight of the uncured resin;

a thermoplastic component comprising a soluble component and an insoluble component wherein said soluble component comprises 10 to 20 weight percent polyether sulfone based on the total weight of the uncured resin and said insoluble component comprises from 5 to 15 weight percent polyamideimide particles based on the total weight of the uncured resin and from 2 to 10 weight percent polyamide particles based on the total weight of the uncured resin and wherein said insoluble component and said uncured resin do not comprise elastic particle; and a curing agent consisting essentially of 4,4'-Bis(p-aminophenoxy)biphenyl and/or isomers thereof, wherein said curing agent is present in an amount of from 20 to 30 weight. percent based on the total weight of the uncured resin.

2. An uncured resin according to claim 1 wherein the molecular weight of said polyethersulfone is between 15,000 and 25,000 g/mole.

3. An uncured resin according to claim 1 wherein said polyamide particles range in size from 5 to 60 microns.

4. An uncured resin according to claim 1 wherein the average particle size of said polyamideimide particles ranges from 8 to 20 microns.

5. An uncured resin according to claim 1 wherein said polyamide particles comprise polyamide 6.

6. An uncured resin according to claim 1 wherein the weight ratio of polyamideimide particles to polyamide particles is 3.2 to 1.

7. An uncured resin according to claim 3 wherein the average particle size of said polyamideimide particles ranges from 8 to 20 microns.

8. An uncured resin according to claim 7 wherein said polyamide particles comprise polyamide 6.

9. An uncured resin according to claim 8 wherein the weight ratio of polyamideimide particles to polyamide particles is 3.2 to 1.

10. An uncured resin according to claim 1 wherein said epoxy resin component comprises from 32 to 34 weight percent triglycidyl-m-aminophenol based on the total weight of the uncured resin and from 14 to 16 weight percent tetra. functional para-glycidyl amine based on the total weight of the uncured resin, said soluble component comprises from 13 to 15 weight percent polyether sulfone based on the total weight of the uncured resin, said insoluble component comprises from 5 to 10 weight percent polyamideimide particles based on the total weight of the uncured resin and from 2 to 10 weight percent polyamide particles based on the total weight of the uncured resin and wherein said curing agent is present in an amount of from 23 to 26 weight percent based on the total weight of the uncured resin.

11. An uncured resin according to claim 10 wherein the molecular weight of said polyethersulfone is between 15,000 and 25,000 g/mole.

12. An uncured resin according to claim 10 wherein said polyamide particles range in size from 5 to 60 microns.

13. An uncured resin according to claim 10 wherein the average particle size of said polyamideimide particles ranges from 8 to 20 microns.

14. An uncured resin according to claim 10 wherein said polyamide particles comprise polyamide 6.

15. An uncured resin according to claim 10 wherein the weight ratio of polyamideimide particles to polyamide particles is 3.2 to 1.

16. An uncured resin according to claim 12 wherein the average particle size of said polyamideimide particles ranges from 8 to 20 microns.

17. An uncured resin according to claim 16 wherein said polyamide particles comprise polyamide 6.

18. An uncured resin according to claim 17 wherein the weight ratio of polyamideimide particles to polyamide particles is 3.2 to 1.

* * * * *